Patented June 19, 1951

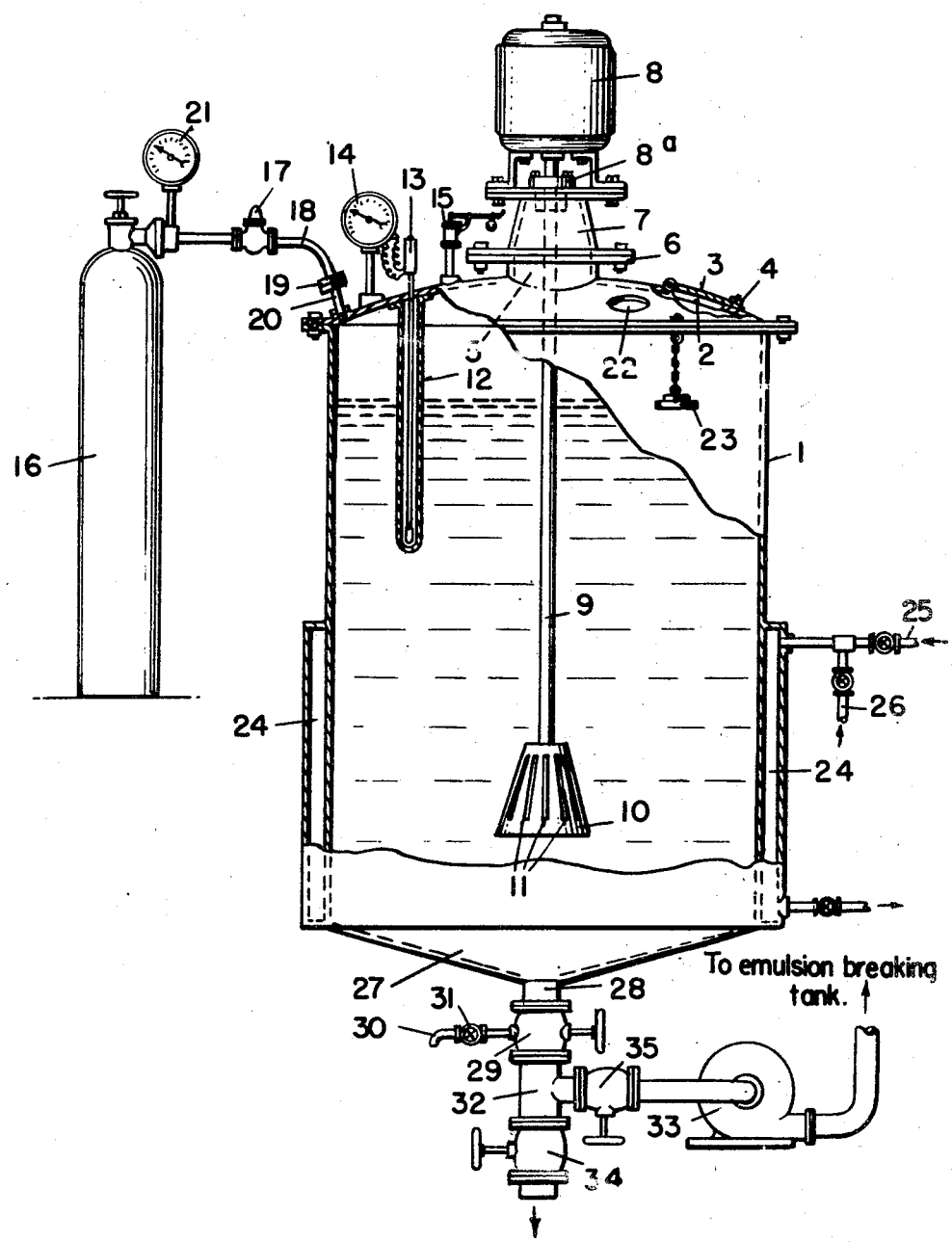

2,557,564

UNITED STATES PATENT OFFICE 2,557,564

OXIDATION OF FATTY MATTER

Herbert Otto Renner, Des Plaines, Ill., assignor, by mesne assignments, to J. R. Short Milling Company, Chicago, Ill., a corporation of Illinois Application March 10, 1947, Serial No. 733,681

7 Claims. (Cl. 99—118)

This invention relates to processes for preparing oxidation products of organic compounds and more particularly has reference to the preparation of organic oxidation products in the presence of material containing enzymes whereby the oxidation of organic compounds is more effectively carried out. Oxidation products so obtained serve as highly efficient bleaching agents for bleaching, for example, oils, fats, waxes, dough and baked food products in general.

In prior art processes of the type referred to, oxidation of organic compounds, to any extent up to a practical or theoretical limit, was accomplished by contacting oxidizable organic compositions with gas containing free oxygen at atmospheric pressure in the presence of material containing enzymes which effect the catalytic oxidation of such compositions. In such prior art processes, as for example those disclosed in my U. S. Patent 1,994,992, issued March 19, 1935, it was found that the longer the period of treatment of certain organic compounds with air, oxygen or ozone, the greater the degree of oxidation. Thus, in processes described in the patent cited, the period of oxidation extended from 45 minutes to 14 hours.

The degree of oxidation of an oxidizable organic material is readily determined by quantitative methods and may be expressed in terms of molecules (M) of hydrogen peroxide per 1000 grams of organic material, or in grams of hydrogen peroxide per 100 grams of organic matter. The so-called M-values are given below in the first mentioned terms, and increases in such values are denoted by $M_1$.

Heretofore, the methods employed for increasing the M-values of an organic composition have comprised lengthening the time of treatment with oxygen, or using additional amounts of enzymic material in proportion to the amount of organic matter treated, or increasing the surface area of contact between the enzymic material and the organic matter treated, as for example, by vigorous agitation or by adding extra quantities of concentrated enzymic extract or enzymic source material to the reaction mixture during the peroxidation process, as disclosed in my U. S. Patent 2,198,015, issued April 23, 1940.

All of these expedients of necessity greatly increase the time and expense of preparing organic oxidation products. There are also definite limitations to the degree to which the expedients may be effectively employed. Thus, an increase in concentration of enzymic materials has heretofore resulted in a corresponding increase in M- values only so long as the mixture of enzymic material and organic matter treated permitted the most intensive incorporation of oxygen or air. It is, therefore, readily seen that in order to obtain maximum oxidation with, for instance, air as the oxygen source, the system had to be supplied with as much air as possible, and the air had to be brought in contact with the largest possible surface of the organic material treated, within a given unit of time. These requirements necessitated the use of a turbo-mixer, or the equivalent, in order to secure the necessary agitation and reaction conditions.

The use of a turbo-mixer not only required considerable power to operate it, but was also attended with other more serious disadvantages. Thus, too vigorous and powerful mechanical agitation of the reaction mixture of enzymic extract and fatty material (oil) during the peroxidation step produced an excessive dispersion of the solid particles in the enzymic extract which resulted in increased difficulties in separating the peroxidized oil from the extract by centrifuging. Furthermore, such violent agitation caused excessive incorporation of air in the reaction mixture which greatly weakened the strength of the enzymic extract, the enzymes being partially inactivated by excess oxidation, thus increasing the time required to produce a peroxidized oil of required M-value. The incorporation of air in the reaction mixture created air-containing emulsions which greatly resist breaking the emulsion after the peroxidation reaction is completed.

As a result of extensive research and experimentation to find solutions for the difficulties mentioned above, I have found that greatly improved results are obtained if the peroxidation reaction is performed in a closed vessel under superatmospheric pressure, with gentle horizontal stirring substituted for turbo-agitation so that the liquid phases move slowly in substantially horizontal planes without appreciable vertical currents. Under these conditions, while there is accomplished a thorough intermingling of the oil and aqueous phases of the reaction mixture, the absence of violent agitation permits the oil which is lighter than the aqueous extract, to form a top layer in the reaction system. This intermingling is variously described in this specification as commingling or mixing without implying that the oil material and the aqueous extract are miscible in the usual sense of the term. This oil film excludes the aqueous extract, which is comparatively sensitive to oxidation, from direct contact with the oxygen under pressure until the oxygen has been well absorbed and dissolved in the oil which action is promoted by the high solubility of oxygen under pressure in vegetable oils. The main function of the stirrer in this process is reduced to that of thoroughly contacting only two phases, the aqueous extract phase and the oil phase, with the latter containing the third (gaseous oxygen phase) in a dissolved state, in contrast to the prior art open tank method which required the simultaneous contacting of the two liquid phases with each other and with the gaseous phase (air or oxygen) which differs markedly as to density from the liquid phases. With the new method, higher M-values of the peroxidized oil were obtained with far less expenditure of time, power and materials, as will be indicated hereinafter.

An object of the present invention is to provide a process of preparing organic oxidation products more efficiently and effectively by contacting the organic matter to be treated by gas containing oxygen, under superatmospheric pressure, in the presence of enzymic material containing enzymes which effect the catalytic oxidation of the organic compositions, without violent agitation which weakens the catalytic action of the enzymic material by oxidation of its enzymes.

Another object of this invention is to reduce the time and power required in a process of the character described whereby the cost of the process is reduced and the quality of the product enhanced.

Other and more detailed objects of the present invention will become apparent from the following specification and appended claims, when considered in connection with the accompanying drawing, in which the figure is a view, partly in elevation and partly in central vertical section, illustrating somewhat diagrammatically an apparatus for carrying out the process in accordance with the present invention.

As shown in the accompanying drawing, there is provided a chamber 1, which is the body of a special pressure auto-clave, of stainless steel or glass lined steel, into which the organic matter (e. g. peanut oil) and the enzymic material are introduced through a charging aperture 22, equipped with a screw plug 23, for gas-tight closure after charging is completed. The cover of the chamber 1 is provided with a manhole 2 equipped with a hinged cover 3 which is adapted to be held in gas-tight closed position by an adjustable nut 4. This manhole affords access to the interior of the chamber 1 for inspection and cleaning of interior.

The chamber 1 is provided at its upper end with a central opening 5 surrounded by an outwardly extending flange 6 which forms a seat for the base frame 7 of a motor 8. The frame 7 is bolted to the flange 6 and to the base of the motor 8 by suitable bolts with gaskets interposed between abutting surfaces so as to secure motor 8, in vertical alignment with the vertical axis of chamber, with an air-tight connection.

A vertically disposed shaft 9 is mounted in the motor 8 through an air-tight gland nut 8a which holds the shaft 9 in true alignment and prevents escape of gas pressure around said shaft. Attached to the lower end of the shaft 9 is a hollow cone stirrer 10 provided with a plurality of longitudinal slots 11. This stirrer could, obviously, be of any appropriate shape and type, but the hollow cone shape has been found to be most suitable for the required degree of very moderate stirring.

Attached to the head wall of the chamber 1, is a thermometer well 12 with an opening in the head wall into which is inserted a thermometer 13 or the connection for a thermoelectric pyrometer 14, for recording the temperature of the reaction mixture.

The cover of the chamber 1 is equipped with a pressure relief valve 15 of a conventional type to permit the escape of gas from the chamber 1 in case of excess pressure developing in said chamber.

Oxygen or compressed air is supplied to the chamber 1 at a predetermined superatmospheric pressure from a commercial gas cylinder 16 through a conventional pressure reducing and regulating valve 17 and conduit 18, attached by a sleeve nut 19, to nipple 20 mounted on the head wall of chamber 1. A pressure indicator 21 is connected to the conduit 18 to show the gas pressure in said conduit at all times. Introduction of oil and aqueous extract into the chamber 1 is by means of flexible conduits which are inserted into the chamber 1 through the aperture 22 while liquids are being introduced into the chamber 1. After the proper amounts of oil and aqueous liquid have been fed into the chamber 1 for a batch reaction, the flexible conduits are withdrawn and the aperture 22 is closed gas-tight by the screw plug 23.

The lower part of the chamber 1 is equipped with a heating or cooling jacket 24, into which steam or hot water for heating, or brine or other cooling liquid for cooling, the contents of the jacket 24 may be introduced through conduits 25 and 26 communicating with suitable sources of supply of heating or cooling liquids (not shown).

The contents of the chamber 1 are discharged through a self-draining conical bottom 27 and flanged outlet 28, connected to a pressure valve 29 which is provided with a sampling tube 30 controlled by a valve 31. A flange pipe-T 32 connects the valve 29 with a centrifugal discharge pump 33, and is equipped with valves 34 and 35 for cleaning and emergency purposes. A centrifugal pump 33 lifts the discharged liquid to a breaking tank (not shown). If this tank is located below the chamber 1, the discharge may be effected by gravity and the pump 33 is dispensed with.

The enzyme peroxidation of peanut oil in the above described apparatus, in accordance with the present invention, comprises the following steps:

(1) After the proper amounts of refined peanut oil and enzyme extract, both of optimal temperature, have been transferred into the reaction autoclave chamber 1 and liquid flow of heating or cooling water through the jacket 24 is adjusted so as to maintain optimal reaction temperature, the chamber 1 is closed and an oxygen pressure of 28–30 lbs. above the atmosphere established within the chamber, by adjustment of the pressure regulating valve.

(2) As soon as the desired gas pressure is reached, the stirrer is started and run for the pre-calculated period (about 30 minutes) while optimal gas pressure is maintained automatically. The stirrer is run at a very moderate speed so that the oil will form a film on the surface of the liquid in the autoclave and protect the enzymic extract from direct contact with the oxygen above the film during the reaction period.

(3) As soon as the desired degree of enzyme peroxidation is reached, the oxygen-gas supply is cut off, and contents of the chamber 1, by means of the centrifugal pump 33 aided by the gas pressure in the reaction tank, is speedily transferred into an emulsion "breaking tank," not shown.

(4) As soon as the chamber 1 is emptied and the pressure is released, the chamber's manhole 3 is opened and the inside of the chamber and the agitator 10 washed and sprayed with hot water, the wash water also being pumped into the "breaking tank."

Example

As illustrative of the process of the present invention, the following example discloses the preferred method of pressure-autoclave production of enzyme-peroxidized peanut oil by means of peanut enzyme extract, and exemplifies the increased efficiency of performing this process under super-atmospheric conditions, as compared to the prior art process of carrying out this reaction under atmospheric pressure in an open tank.

ture is maintained between 70° and 80° F. by means of the cooling jacket 24 surrounding the chamber. After the desired degree of enzyme peroxidation of the peanut oil has been reached, the contents of the autoclave chamber 1 are blown by its own gas pressure or pumped into the "breaking" tank where the oil phase is separated from the reaction mix and purified.

Although compressed air could be employed in lieu of pure oxygen, the nitrogen in the air acting as a diluent slows up the reaction and makes it less effective. Therefore, the use of pure oxygen is preferred. By the foregoing method, the desired M-value increase of $$M_i = 0.045 - 0.054$$

was produced with a 30 minute reaction period without any difficulty.

The following Table 1 shows the practical superiority of the above pressure-autoclave method of enzyme peroxidation over the prior art Open-Tank-Turbomixer method:

Table 1

| Table # | A | | B | | |
|---|---|---|---|---|---|
| | Old Turbomixer-Open Tank Method | | Pressure-Autoclave Method (single bottom stirrer) | | |
| | Reaction Temp., °F. | M-Value-Increase ($M_i$) Produced In Peanut Oil | React. Temp., °F. | Oxygen Pressure, lbs./sq. in. | M-Value Increase ($M_i$) Produced |
| 1 | 76–104 | 0.045 Extract-conc.; 6.0% Whole Peanuts | 76–104 | 29–33 | 0.069 = 152.3% of A-value. |
| 2 | 67–98 | 0.038 Extr.-conc.; 2.35% of Old, Solvent-Extr. Peanut Meal. | 76–98 | 33 | 0.063 = 163.6% of A-value. |
| 3 | 67–97 | 0.045 Extract-conc.; 4.7% Whole Peanuts | 68–94 | 33–35 | 0.057 = 127.8% of A-value. |

The peanut enzyme extract is prepared by suspending:

47.0 parts by weight (instead of the 60.0 parts as required by open tank method) of freshly ground whole peanuts or:

23.5 parts by weight of solvent-extracted peanut meal of an enzyme-activity equal to that of 47 parts of whole peanuts, in a solution of:

2.69 parts by weight of calcium chloride ($CaCl_2.2H_2O$)

and 0.20 parts by weight of sodium bicarbonate ($NaHCO_3$) C. P.

in 1000 parts by weight of cold distilled water of about 7.2°–12.8° C. (=45°–55° F.), gently agitating the suspension while avoiding aeration for about 35 minutes and thoroughly centrifuging the suspension.

Then, 400 parts of the resulting transparent-turbid centrifuged extract and 400 parts of cooled refined peanut oil are transferred into the pressure autoclave chamber 1 described above, the capacity of which preferably exceeds the total volume of the reaction-mixture by about 10%. After the chamber 1 is secured tightly closed, its interior is connected with a cylinder of compressed oxygen and brought within a very short time to the optimal working pressure, preferably 28–30 lbs. of oxygen. As soon as this pressure is reached, thorough intermingling of the reaction mix is carried out by gentle horizontal stirring while said oxygen pressure is maintained. The temperature of the reaction mix- With regard to the increase, $M_i$, in the M-value produced by the process of this invention, the results of Table 1, columns A and B, are directly comparable, as in both cases exactly the same enzyme extract, the same ratio of oil to extract (1 g./1 cc.), and the same reaction period (30 minutes) were employed. The gas pressures given in column B represent pure oxygen gas-pressures produced above the normal air pressure present in the closed autoclave. Since in commercial practice a maximal $M_i$-value of only 0.047–0.054 is desired, the use of the pressure-autoclave to obtain this result permits either a reduction of the reaction period, or a substantial reduction in the enzyme-extract concentration, i. e. in the quantity of peanut-meal required (compare results of Table 1, column B, #3, which is obtained by the autoclave method, with 4.7% whole peanuts, as compared with the result of column A, #1 obtained with 6.0% whole peanuts, by open tank method). While I have indicated the use of peanut oil in the above example of my invention, I have found that this invention is equally successful with other fatty materials, such as those disclosed in my U. S. Patents 1,994,992 and 2,198,015 cited.

The invention has been disclosed herein for illustrative purposes in its preferred embodiment, but it is to be understood that the scope of the invention is defined by the appended claims rather than by the foregoing description.

What I claim is:

1. A process of preparing oxidation products of fatty materials, which process comprises mixing an aqueous extract containing oxidizing enzymes with a liquid fatty material in a closed vessel, subjecting said mixture to an inert gas containing free oxygen under superatmospheric pressure of approximately 30 pounds per square inch applied to the surface of the mixture in said vessel without agitating the mixture, gently stirring said mixture so that its component phases move in substantially horizontal planes and a film of the lighter fatty liquid is formed on the surface of the mixture, thereby protecting the enzymes from direct contact with the free oxygen at the liquid surface, continuing said stirring and pressure for approximately 30 minutes.

2. A process of preparing organic oxidation products, which process comprises commingling liquid oxidizable fatty matter with liquid enzymic material containing oxidizing enzymes and which is of greater specific gravity, whereby said fatty matter forms a covering layer over said enzymic material, subjecting the free surface of said covering layer to inert gas containing free oxygen under superatmospheric pressure without appreciably agitating the commingled liquids; and gently stirring said liquids horizontally to avoid aeration and formation of stable emulsions and to thoroughly dissolve said oxygen in the fatty matter of said covering layer, thus preventing the inactivation of said enzymes by direct contact with undissolved oxygen.

3. A process of preparing organic oxidation products according to claim 2 characterized by applying free oxygen alone under superatmospheric pressure to the top surface of said liquid mixture and simultaneously stirring said liquid mixture without turbulence and aeration so as to prevent the incorporation of undissolved oxygen in said liquid mixture.

4. A process of preparing organic oxidation products, which process comprises commingling liquid oxidizable fatty matter with liquid enzymic material containing oxidizing enzymes and which is of greater specific gravity, whereby said fatty matter forms a covering layer over said enzymic material, subjecting said commingled liquids to inert gas containing free oxygen under superatmospheric pressure without appreciably agitating the commingled liquids; and gently stirring said liquids horizontally to avoid aeration and formation of stable emulsions and to thoroughly dissolve said oxygen in the fatty matter of said covering layer, thus preventing the inactivation of said enzymes by direct contact with undissolved oxygen.

5. A process according to claim 4 wherein the oxygen is supplied as a component of compressed air.

6. A process according to claim 4 wherein the oxygen is dissolved in said fatty material under a superatmospheric pressure of approximately 30 pounds per square inch, and the total period of treatment is approximately 30 minutes.

7. A process according to claim 4 wherein the liquid mixture is maintained at a temperature between approximately 70° F. and 100° F. during said process.

HERBERT OTTO RENNER.

REFERENCES CITED

The following references are of record in the file of this patent:

UNITED STATES PATENTS

| Number | Name | Date |
|---|---|---|
| 1,994,992 | Haas | Mar. 19, 1935 |
| 2,198,015 | Renner et al. | Apr. 23, 1940 |
| 2,217,515 | Houpt | Oct. 8, 1940 |
| 2,307,495 | De Groote et al. | Jan. 5, 1943 |
| 2,316,621 | Renner | Apr. 13, 1943 |
| 2,349,377 | Renner | May 23, 1944 |

FOREIGN PATENTS

| Number | Country | Date |
|---|---|---|
| 14,518 | Great Britain | 1903 |